(12) United States Patent
Jouanno et al.

(10) Patent No.: US 6,246,809 B1
(45) Date of Patent: Jun. 12, 2001

(54) ASYMMETRIC THERMO-OPTICAL SWITCH

(76) Inventors: Jean-Marc Mg Jouanno, 15, boulevard Crevat Durant; Marc Moroni, 2, rue St Honore, both of 77300 Fontainebleau (FR)

( * ) Notice: Subject to any disclaimer, the term of this patent is extended or adjusted under 35 U.S.C. 154(b) by 0 days.

(21) Appl. No.: 09/304,293

(22) Filed: May 3, 1999

(30) Foreign Application Priority Data

Jan. 15, 1999 (EP) ............................................... 994000149

(51) Int. Cl.[7] ...................................................... G02B 6/26
(52) U.S. Cl. ................................................................ 385/22
(58) Field of Search ............................... 385/18–26, 147

(56) References Cited

U.S. PATENT DOCUMENTS

| | | | |
|---|---|---|---|
| 4,753,505 | 6/1988 | Makami et al. | 350/96.13 |
| 4,886,331 | * 12/1989 | Peterson | 385/16 |
| 5,117,470 | 5/1992 | Inoue et al. | 385/14 |
| 5,173,956 | 12/1992 | Hayes | 385/16 |
| 5,319,482 | * 6/1994 | Tsuchiya et al. | 359/110 |
| 5,526,156 | * 6/1996 | Bostica et a. | 359/123 |
| 5,841,912 | * 11/1998 | Mueller-Fiedler et al. | 385/16 |
| 5,881,199 | * 3/1999 | Li | 385/140 |
| 5,892,863 | * 4/1999 | Ishida et al. | 385/24 |
| 5,937,117 | * 8/1999 | Yamada et al. | 385/14 |
| 5,940,548 | * 8/1999 | Davies | 385/14 |
| 6,084,050 | * 7/2000 | Ooba et al. | 385/143 |
| 6,122,416 | * 9/2000 | Ooba et al. | 385/17 |

FOREIGN PATENT DOCUMENTS

| | | |
|---|---|---|
| 0 854 378 A2 | 7/1998 | (EP) . |
| 0 905 546 A2 | 3/1999 | (EP) . |
| WO 96/38756 | 12/1996 | (WO) . |

OTHER PUBLICATIONS

Journal of Lightwave Technology, vol. 7, No. 3, Mar. 1989 pp. 449–453 "Polymeric Optical Waveguide Switch Using the XP 002031580 Thermooptic Effect" by M.B.J. Diemeer et al.

* cited by examiner

Primary Examiner—Akm E. Ullah
(74) Attorney, Agent, or Firm—Daniel P. Malley

(57) ABSTRACT

An asymmetric thermo-optical switch uses materials having different dn/dT coefficients. A first waveguide is constructed on a planar substrate using a material that has a first dn/dT coefficient. A second waveguide is constructed on the planar substrate using a second material that has a second dn/dT coefficient. In a first embodiment, a coupling region is formed between the first and second waveguides. An index-adjusting switch element is deposited on a first side of the device over the coupling region to control the proportion of light coupled between the waveguides. In a second embodiment, a splitting region is formed by connecting the second waveguide to the first waveguide, at a middle portion of the first waveguide. An index-adjusting switch element is deposited on a first side of the device over the splitting region to control the proportion of light split between the waveguides. Because the first and second waveguides have different dn/dT coefficients, tolerances with regard to the positioning and geometry of the index-adjusting switch element can be relaxed. The index-adjusting switch element is implemented by using a heater. When the index-adjusting switch element heats the waveguides, the refractive index of both waveguides vary in a differently, causing the proportion of light propagating in the waveguides to commute from one output to the other.

51 Claims, 5 Drawing Sheets

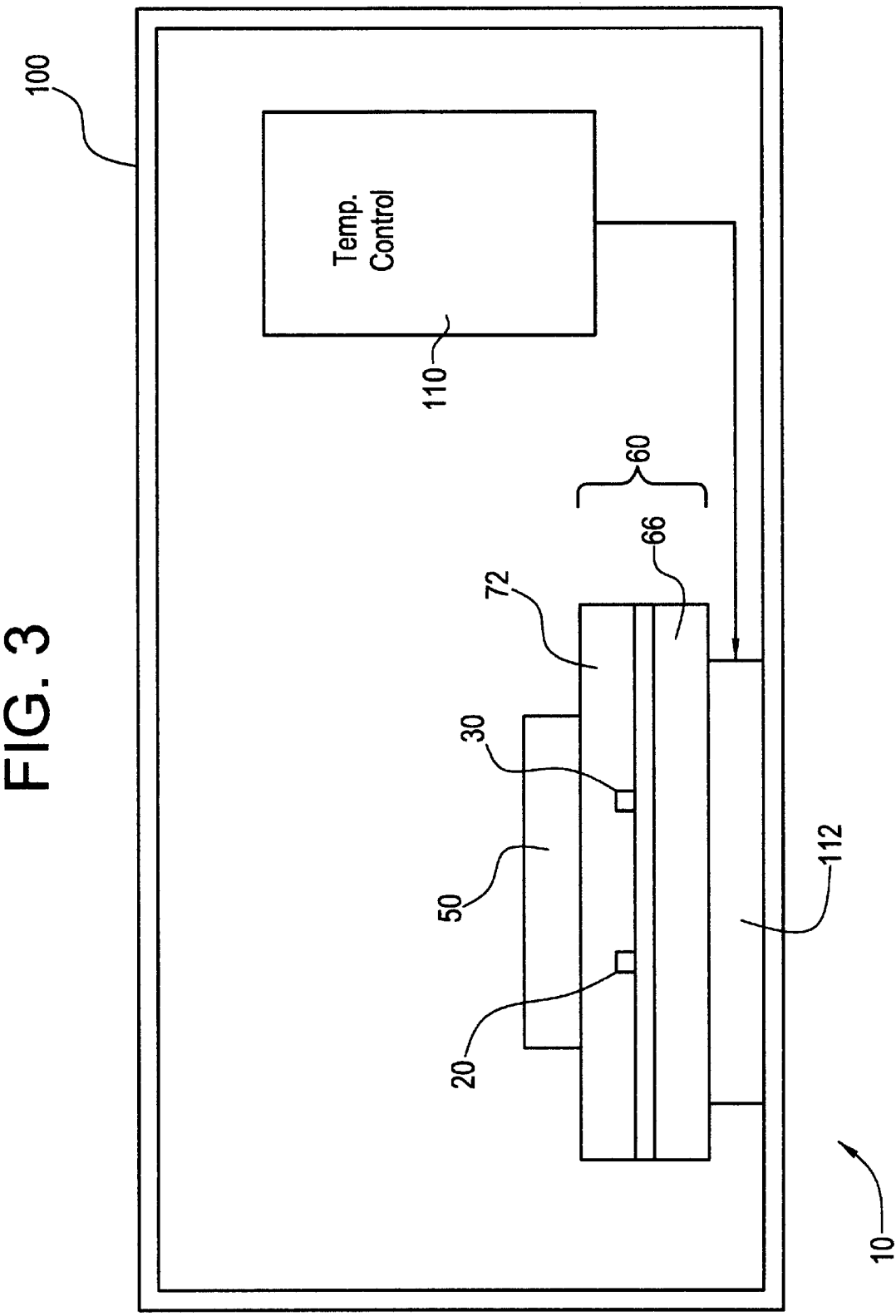

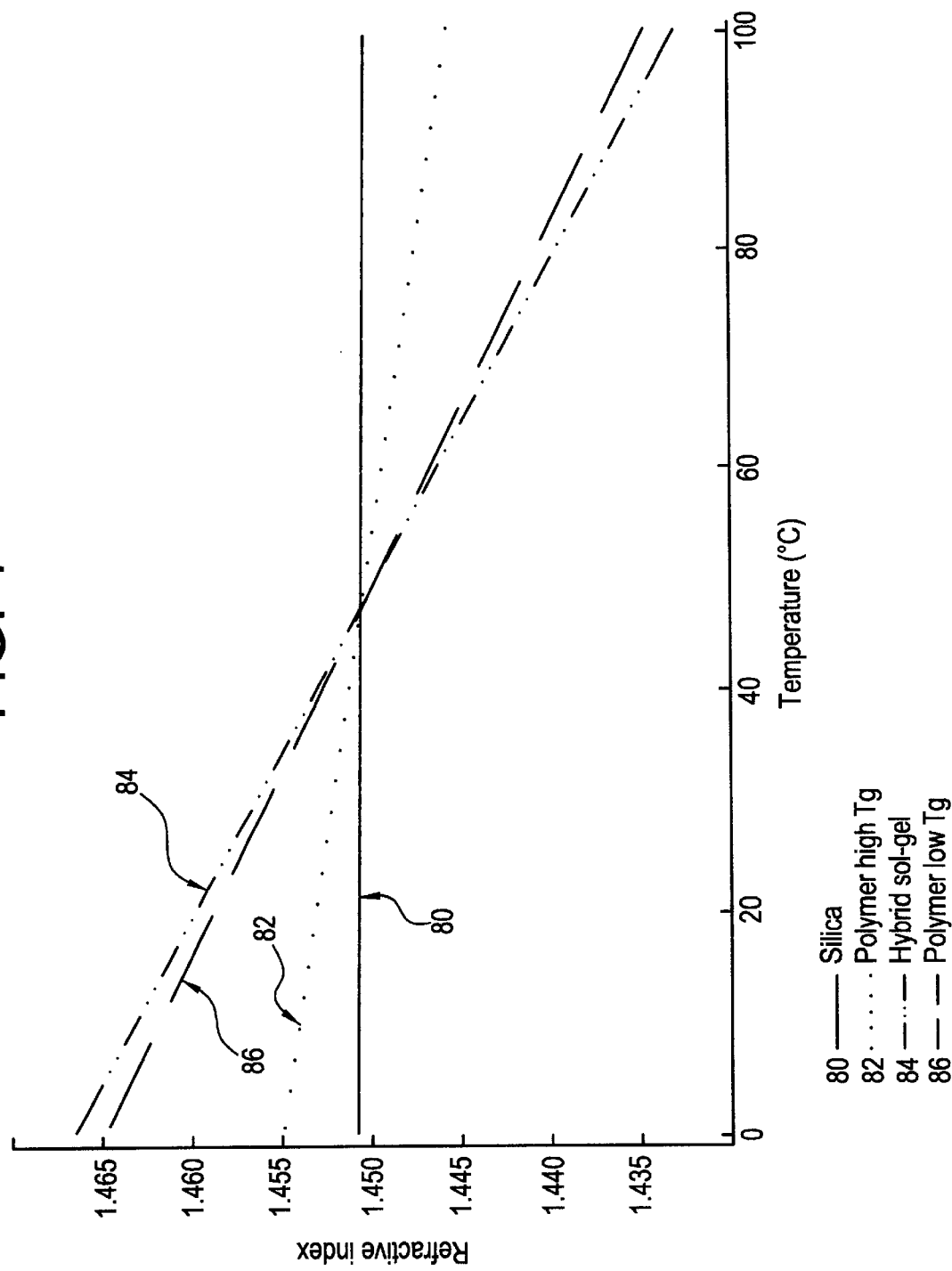

ASYMMETRIC THERMO-OPTICAL SWITCH

BACKGROUND OF THE INVENTION

This application is based upon the European application S.N. 99400014.9, filed Jan. 5, 1999, which we claim as the priority date of this application.

1. Field of the Invention

This invention relates generally to thermo-optical switches, and more particularly to asymmetric thermo-optical switches that use waveguides arms fabricated from materials having different thermo-optical characteristics.

2. Technical Background

The growth in demand for bandwidth has pushed network operators to increase optical network capacity by transmitting many high bandwidth channels through a single fiber. The signal management of these channels would be greatly simplified by using optically transparent switches.

One approach that has been considered involves planar integrated switches. Planar integrated switches are particularly interesting for several reasons. They have a high potential for integration: a plurality of functional elements can be implemented in one planar device. In addition, they are compact and can be relatively inexpensive to produce. Several techniques may be used to achieve optical commutation in a planar device, but one proposal that has been the subject of intense consideration involves thermo-optical switching. This method is particularly advantageous, because it is one of the easiest approaches to implement. Thermo-optical switches operate by selectively changing the refractive index of a waveguide material.

It has been proposed to use polymer materials to implement thermo-optic switches. Polymer materials are well suited for this application. They are relatively easy to handle and can be easily processed to produce waveguides. The refractive indexes of polymer materials exhibit a wide variation in value with respect to temperature. When a polymer waveguide is heated, the large index variations can alter the phase of the signal propagating in the waveguide, or alter the guiding properties of a waveguide itself. Moreover, the change in the refractive index with respect to temperature (dn/dT) is a reproducible and reversible effect. Such switches of this type are already commercially available.

In other approaches, numerous designs have been used to make planar switches. These include Mach-Zehnder interferometers, directional couplers, Y-splitters, and X-splitters. However, one of the main drawbacks of these devices concerns the positioning and geometry of the heater element.

If the heater is not positioned accurately, or the geometry of the heater is not within proper design tolerances, thermal isolation between the arms of the switch will be inadequate, and unacceptable optical cross talk between output ports will result.

Thus, a need exists for a thermo-optic planar waveguide switch that eliminates both the need for designing heating elements that have strict tolerance requirements, and the expensive and time-consuming process of accurately positioning the heating elements on the planar waveguide switch devices.

SUMMARY OF THE INVENTION

Existing problems with conventional thermo-optic couplers are solved by the present invention. The present invention for an asymmetric thermo-optical switch includes a first waveguide and a second waveguide fabricated from materials having different dn/dT coefficients resulting in superior selectivity and low optical cross talk between outputs. Using different dn/dT coefficients enhances the strength of the thermo-optic effect and eliminates the need for designing heating elements that have strict tolerance requirements. Furthermore, this feature also eliminates the expensive and time-consuming process of accurately positioning heating elements on the device. Thus, geometry and positioning of the heater does not have to be implemented with any particular precision.

In one aspect of the invention, an optical device for switching a light signal is disclosed. The optical device includes a substrate having a first side and a second side. A first waveguide is disposed on the first side. The first waveguide has a core characterized by a first refractive index, a middle portion, and a first dn/dT coefficient. A second waveguide is disposed on the first side adjacent to the first waveguide. The second waveguide has a second core characterized by a second refractive index and a second dn/dT coefficient (different from the first dn/dT coefficient). An index-adjusting switch element is disposed on the first side. The index-adjusting switch element controls the proportion of the light signal coupled between the first waveguide and the second waveguide by adjusting the first and second refractive indexes.

In another aspect of the invention, a method for switching a light signal through an optical device is disclosed. The optical device includes a substrate having a first side and a second side. A first waveguide is disposed on the first side. The first waveguide has a middle portion and a first core characterized by a first refractive index and a first dn/dT coefficient. The method for directing a light signal includes the steps of providing a second waveguide on the first side, wherein said second waveguide has a second core characterized by a second refractive index and a second dn/dT coefficient (different from said first dn/dT coefficient). The method includes the step of switching a proportion of the light signal between the first waveguide and the second waveguide by adjusting either of the first refractive index or the second refractive index.

In another aspect of the present invention, a method of making an optical device for switching a light signal is disclosed. The method includes the steps of forming a substrate, wherein the substrate includes a first side and a second side. Forming a first waveguide structure on the first side, wherein the first waveguide structure has a middle region and a first core characterized by a first refractive index and a first dn/dT coefficient. Forming a second waveguide structure on the first side, wherein the second waveguide structure has a core characterized by a second refractive index and a second dn/dT coefficient. Disposing an index-adjusting switch element on the switching region.

The apparatus of the present invention results in a number of advantages over the related art. By using materials with different dn/dT coefficients, the strength of the thermo-optic effect is significantly increased and selectivity is far superior than the related art discussed above. These features eliminate the need for designing heating elements that have strict tolerance requirements to achieve low optical cross-talk. For the same reasons, the present invention also eliminates the expensive and time-consuming process of accurately positioning the heating elements on planar waveguide switch devices.

Additional features and advantages of the invention will be set forth in the detailed description that follows, and in part will be readily apparent to those skilled in the art from the description, or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed:

The accompanying drawings are included to provide a further understanding of the invention, and are incorporated in and constitute a part of this specification. The drawings illustrate one or more embodiments of the invention, and together with the description serve to explain the principles and operation of the invention.

BRIEF DESCRIPTION OF THE DRAWINGS

FIG. 3 is a block diagram of a possible temperature regulation method connected to the switch device of present invention;

FIG. 4 is a diagram illustrating the dependence of the refractive index of various materials with respect to temperature.

DETAILED DESCRIPTION OF THE PREFERRED EMBODIMENTS

Figure 1:
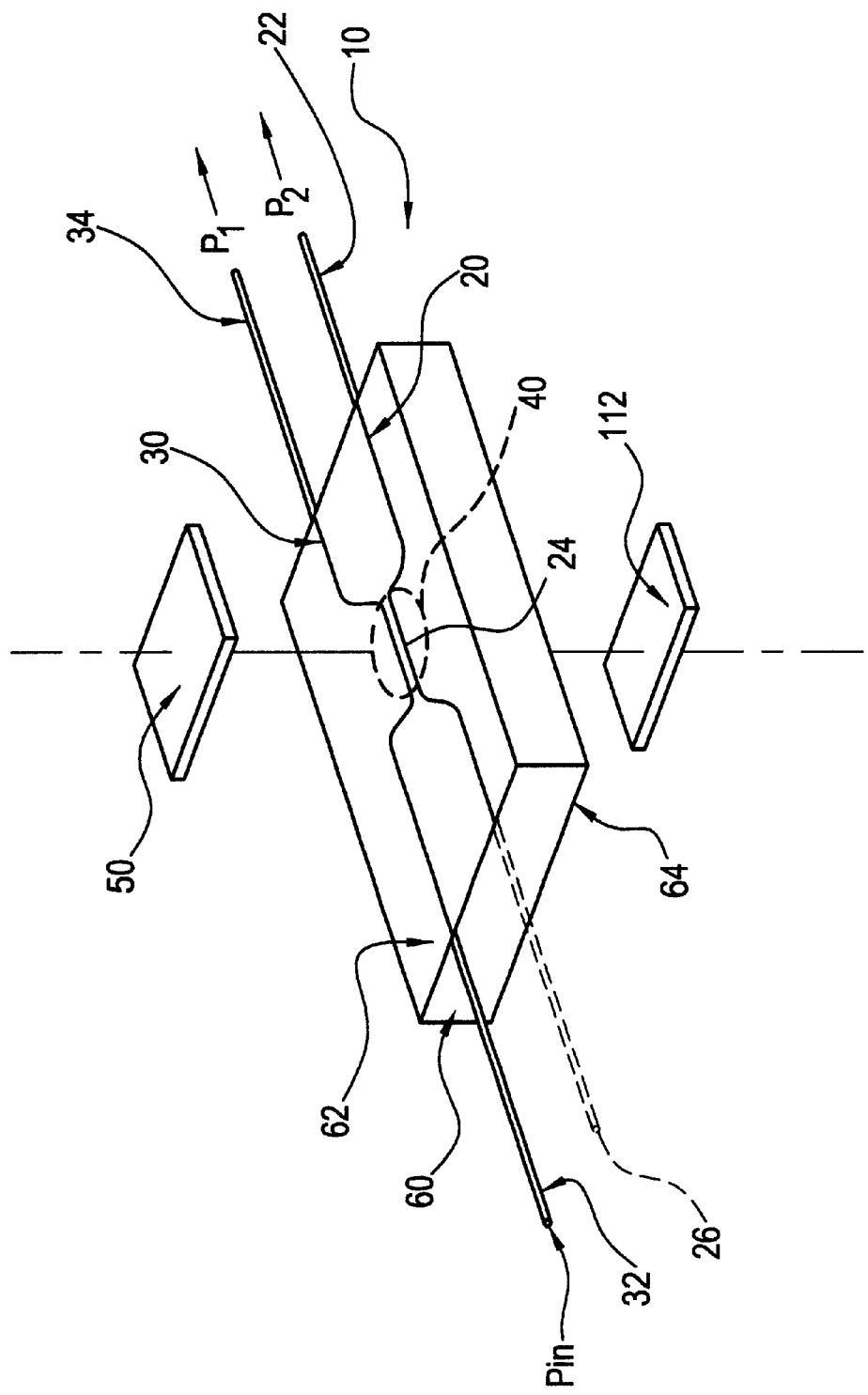
FIG. 1 is an exploded view of a first embodiment of the present invention, an x-type thermo-optical switch.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the asymmetric thermo-optical switch of the present invention is shown in FIG. 1, and is designated generally throughout by reference numeral 10.

In accordance with the invention, the present invention for an asymmetric thermo-optical switch 10 includes a first waveguide 20 and a second waveguide 30 fabricated from materials having different dn/dT coefficients. The present invention uses the first and second waveguides 20 and 30 to thermo-optically switch high bandwidth light signals in optical networks. The present invention provides a relatively simple and inexpensive means for managing light signals. It eliminates the need for designing heating elements that have strict tolerance requirements. Furthermore, the present invention also eliminates the expensive and time-consuming process of accurately positioning heating elements on thermo-optic planar waveguide switch devices. Thus, existing problems with conventional thermo-optic couplers are solved by the present invention. Selectivity is superior, and there is low optical cross talk between outputs because the first waveguide 20 and the second waveguide 30 have different dn/dT coefficients. The geometry and positioning of the heater does not have to be implemented with any particular precision. Preferably the dn/dT coefficients have opposite algebraic signs, but functioning switches can be fabricated in which the dn/dT coefficients have the same sign.

As embodied herein and depicted in FIG. 1, the asymmetric 2×2 directional coupler 10 includes a first waveguide 20 and a second waveguide 30. The first waveguide 20 and second waveguide 30 are made of materials having different dn/dT coefficients. A coupling region 40 is formed on the substrate between the middle portion 24 of the first waveguide 20, and the second waveguide 30, as shown in FIG. 1. A refractive index-adjusting switch element 50 is disposed on wafer 60 over the coupling region 40. In one embodiment of the present invention, the refractive index-adjusting switch element 50 is a heater element. The heater element is implemented using a large heating electrode, which is disposed over the coupling region 40 on the first side 62. Note that in FIG. 1 the overclad layer is not depicted for ease of illustration. Thus, the heater 50 is not deposited directly on the core waveguide. The overclad layer is needed to ensure the optical isolation of the mode propagating in the waveguide. Otherwise, the metal in the heater 50 would absorb the light. An optional cooling element 112 can also be added to the switching device 10. In FIG. 1 the cooling element 112 is positioned on the second side 64 of substrate 10. The cooling element 112 is used to keep the device at a constant temperature. It does not necessarily have to be positioned against the substrate. Cooling element 112 will be discussed in more detail below with respect to FIG. 3.

In another embodiment of the present invention, the first waveguide 20 is fabricated from silica glass and the second waveguide 30 is fabricated from polymer, hybrid sol-gel, or other organic materials. Silica glass has a positive dn/dT coefficient in that its refractive index increases when the temperature increases. Polymer, hybrid sol-gel, or other organic materials generally have negative dn/dT coefficients such that their refractive indices decrease as temperature increases. One of ordinary skill in the art will recognize that any suitable waveguide materials can be used to implement the first waveguide 20 and second waveguide 30, as long as the materials have different dn/dT coefficients.

Switch 10 in FIG. 1 operates as follows. A light signal enters the device at input port 32. Note that if optional input fiber 26 is used, the device 10 becomes a 2×2 switch. In the coupling region 40, the evanescent field of the mode propagating in the second waveguide 30 enters the first waveguide 20, and optical power is thus transferred from one waveguide 20 to the other waveguide 30. The proportion of light coupled depends on the distance or physical displacement between waveguides 20 and 30, the length of the coupling region 40, and the mode propagation constants of the waveguides 20 and 30. When the index-adjusting switch element 50 is off, the temperature of the waveguides 20 and 30 is maintained at a predetermined temperature such that maximum coupling occurs. Thus, when the index-adjusting switch element 50 is inactive, the light signal exits the device 10 at the first output port 22. The coupling between the second waveguide 30 and the first waveguide 20 is adjusted by activating the index-adjusting switch element 50. The index-adjusting switch element 50 controls the temperature of the waveguide and thus its refractive index due to the operation of the dn/dT coefficient. Coupling is a maximum before heating. After the waveguides are heated, the propagation constants of the modes propagating in the waveguides are altered. In the embodiment wherein the first waveguide 20 is comprised of silica glass and the second waveguide 30 is comprised of either polymer, hybrid sol-gel, or other organic materials, the refractive index of the second waveguide 30 decreases significantly, whereas the refractive index of the first waveguide 20 increases only slightly. As the temperature of the waveguides 20, 30 begin to increase and move out of the predetermined temperature range, the amount of light coupled between the first waveguide 20 and the second waveguide 30 decreases. Heat must be continuously applied to commute the power from the first output 22 to the second output 34. Otherwise, the heat will dissipate and the switch will revert to its initial state.

Figure 2:
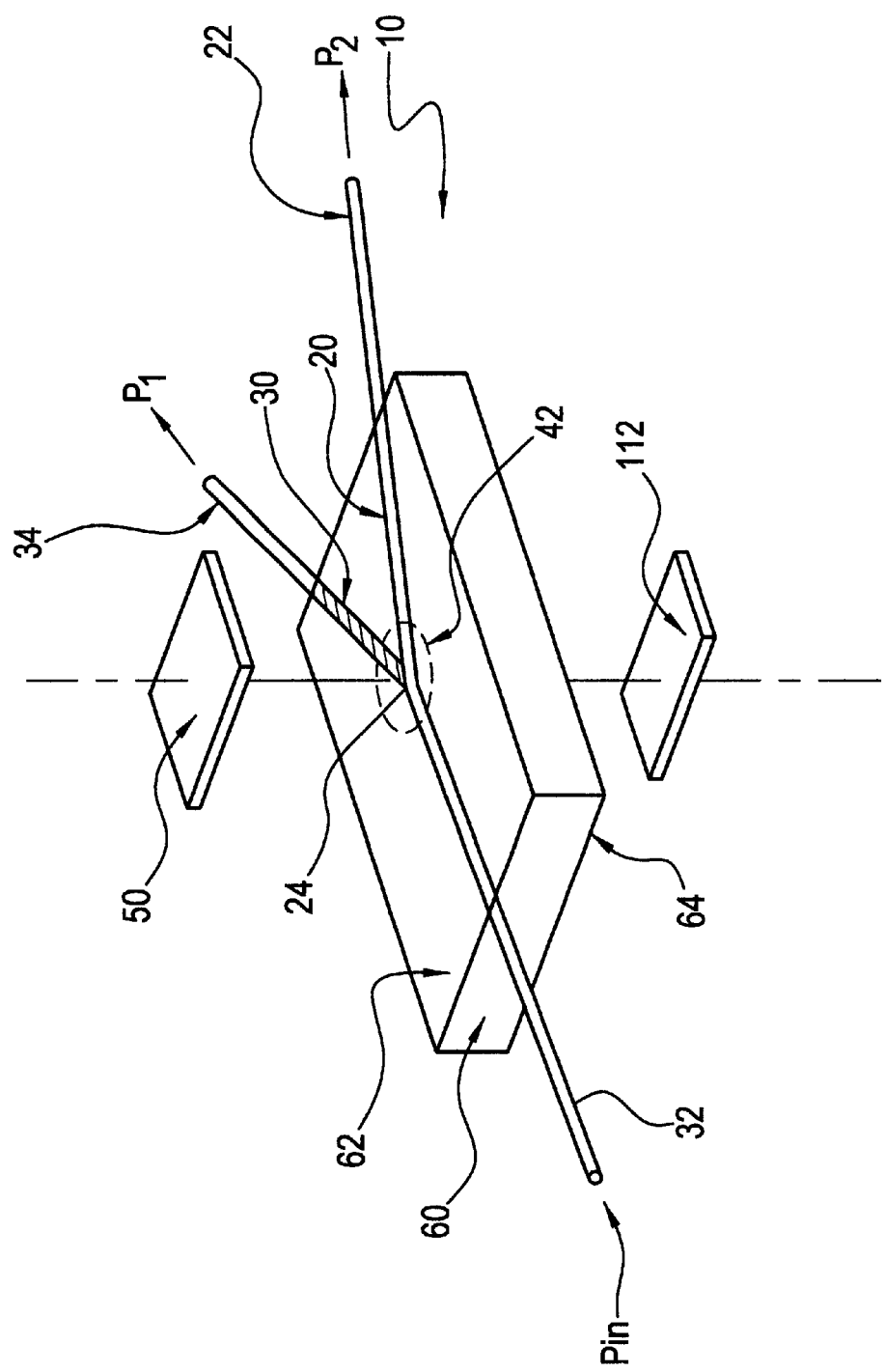
FIG. 2 is an exploded view of a second embodiment of the present invention, a y-type type thermo-optical switch.

In an alternate embodiment of the present invention, as embodied herein and as shown in FIG. 2, an exploded view of Y-splitter digital switch 10 is disclosed. First waveguide 20 is disposed on a first side 62 of substrate 60. A second waveguide 30 is also disposed on the first side 62 of substrate 60. The second waveguide 30 is connected to the first waveguide 20 at a middle region 24 of the first waveguide 20, forming an Y-configuration. The first waveguide 20 and second waveguide 30 are made of materials having different dn/dT coefficients. A splitting region 42 is formed at midpoint 24, where the first waveguide 20 and the second waveguide 30 connect. A refractive index-adjusting switch element 50 is disposed on substrate 60 over the splitting region 42. In one embodiment, the refractive index-adjusting switch element 50 is implemented using a heater, such as a large heating electrode. As noted above, because the first waveguide 20 and the second waveguide 30 have different dn/dT coefficients, the geometry and positioning of index-adjusting element 50 does not have to be implemented with any particular precision. Note that in FIG. 2 the overclad layer is not depicted. The heater 50 is not deposited directly on the core waveguide. The overclad layer is needed to ensure the optical isolation of the mode propagating in the waveguide. Otherwise, the metal in the heater 50 would absorb the light. In another embodiment of the present invention, an optional cooling element 112 is positioned on the second side 64 of substrate 60. Cooling element 112 will be discussed in more detail below, in reference to FIG. 3.

In another embodiment of the present invention depicted in FIG. 2, the first waveguide 20 is made of silica glass and the second waveguide 30 is fabricated from polymer, hybrid sol-gel, or other organic materials. Silica glass has a positive dn/dT coefficient in that its refractive index increases when the temperature increases. Polymer, hybrid sol-gel, or other organic materials generally have negative dn/dT coefficients such that their refractive indices decrease as temperature increases. One of ordinary skill in the art will recognize that any suitable waveguide materials can be used to implement the first waveguide 20 and second waveguide 30, as long as the materials have different dn/dT coefficients.

The Y-splitter 10 in FIG. 2 operates as follows. A light signal enters the device at input port 32. Power splitting is asymmetric due to both the geometry and/or the index differences between the first waveguide 20 and the second waveguide 30. When index-adjusting element 50 is off, the temperature of the waveguides 20 and 30 are in the predetermined ambient temperature range and the light signal entering input port 32 is routed into second waveguide 30 and the light signal exits switch 10 at output port 34. The proportion of light split between output port 22 and output port 34 is adjusted by changing the refractive index of waveguides 20 and 30 by activating the refractive index-adjusting switch element 50. In the embodiment wherein the first waveguide 20 is comprised of silica and the second waveguide 30 is comprised of a polymer material, as the temperature in the splitting region 42 begins to increase, the refractive index of the second waveguide 30 decreases significantly and the refractive index of the first waveguide 20 begins to increase slightly. During heating, the propagation constants of the modes propagating in the two waveguides 20 and 30 cross each other. As the temperature rises the propagation constant in waveguide 20 becomes higher than the propagation constant of waveguide 30, and the light signal will exit the device at output port 22. In order to switch the light signal back to output port 34, index-adjusting element 50 is deactivated and the temperature in the coupling region 42 is quickly lowered due to the heat dissipation characteristics of substrate 66 (see FIG. 3) and the light signal again exits output port 34.

As embodied herein and depicted in FIG. 3, one possible temperature regulation of the optical device 10 is described. Packaging 100 is provided to protect optical device 10 from the environment. The temperature controller 110 maintains the temperature of optical device 10 in the predetermined temperature range discussed above. The temperature range the device is maintained at is not necessarily room temperature. In one embodiment, the nominal temperature is +85° C. Substrate 66 behaves as a heat sink. When the index-adjusting element 50 is activated, the glass temperature at the surface increases. The heat propagates in the overclad layer 72 and increases the temperature of waveguides 20 and 30. The heat is transmitted through the material to the substrate 66. The heat conductivity of substrate 66 is so high that the heat is dissipated as soon as it reaches the substrate 66. Thus, there is a thermal gradient between the index-adjusting switch element 50 and the substrate since the substrate 66 is always near the predetermined temperature. When the index-adjusting element 50 is deactivated, all of the heat is dissipated by the substrate 66 and exits the packaging 100 by thermal conduction. The cooling element 112 is optional and it functions to keep the temperature of the device 10 constant. The cooling element 112 is activated when the external temperature or the heat dissipated in the device package rises to an intolerable level. It will be noted that the cooling element 112 does not need to be positioned against the substrate 66. The cooling element 112 is can be implemented using a Peltier element or an equivalent device. One of ordinary skill in the art will appreciate that other methods of controlling the temperature of device 10 can be used, such as regulating the temperature of the entire package 100.

FIG. 4 is a diagram illustrating the dependence of the refractive index of various materials with respect to temperature. Optical waveguides are usually made of silica because of their low losses at the 1.55 $\mu$m wavelength window. The slope of the silica curve 80, dn/dT, is positive and relatively constant over a wide range of temperatures. The silica curve 80 does not have a large variation of refractive index with respect to temperature. Polymer materials, on the other hand, have curves that are negatively sloping, e.g., have negative dn/dT values. Their refractive indexes have a large variation with respect to temperature. Polymers with low Tg range from $-2$ to $-4 \times 10^{-4\circ}$ C.$^{-1}$ above Tg (see curve 86), the glass transition temperature, whereas polymers with high Tg (curve 82) have a dn/dT value that is typically from $-1 \times 10^{-4\circ}$ C.$^{-1}$ below the glass transition temperature Tg. Instead of polymers, organic materials or sol-gel hybrid materials may be used to provide the same effect. The hybrid sol-gel curve 84 is also shown in FIG. 3. Both the sol-gel materials and organic materials present large and negative dn/dT values in the range between $-2$ to $-5 \times 10^{-4\circ}$ C.$^{-1}$.

Figure 5A:
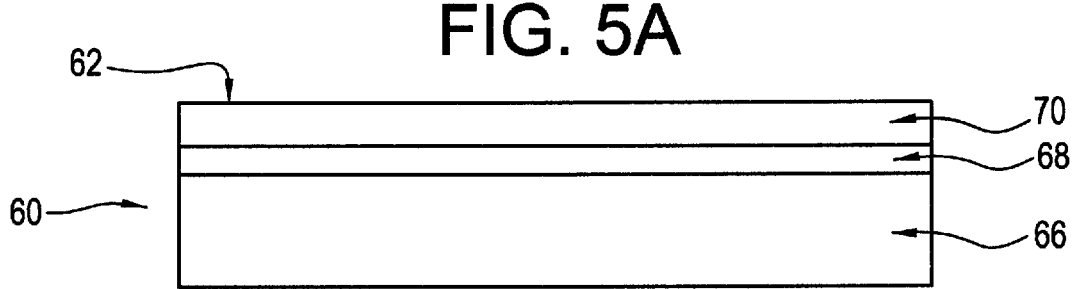
FIGS. 5A–E are sequential diagrammatic views of the optical switch of the present invention in successive stages of fabrication.

FIGS. 5A–E are diagrammatic views of the present invention showing the optical switch in various stages of fabrication. In FIG. 5A, a wafer 60, having a first side 62 and a second side 64 is formed. The wafer 60 is formed having a substrate 66, an underclad layer 68, and core layer 70. Substrate 66 is preferably made of silicon or other materials that exhibit similar heat conductivity to ensure adequate heat dissipation. Substrate 66 is not necessarily made of silicon. As one of ordinary skill in the art will recognize, the material used to fabricate substrate 66 must have good heat conductivity in order to function as a heat sink.

Figure 5B:
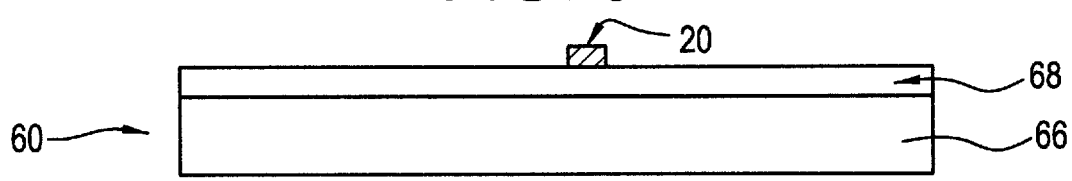

In FIG. 5B, a first waveguide structure 20 is formed preferably of a silica glass material. This step is typically performed using standard photolithographic techniques. However, it will be apparent to those of ordinary skill in the pertinent art that modifications and variations can be made to the step shown in FIG. 5B of the present invention. For example, UV beam illumination, ion implantation, and other suitable techniques may be employed to form the waveguide structures 20 and 30.

Figure 5C:
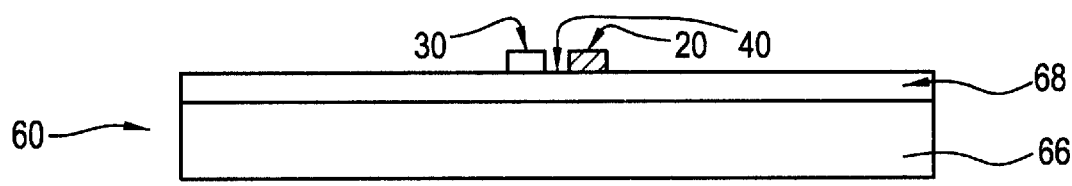

In FIG. 5C a second waveguide structure 30 is formed. This step consists of (not shown in FIG. 5C) depositing a layer of polymer core material on underclad layer 68. After curing, a photoresist layer is deposited over the polymer layer. A pattern of the polymer waveguide structure is transferred onto the photoresist layer by radiating UV light through a mask. Excess photoresist and core material are then removed to form the second waveguide structure 30. However, it will be apparent to those of ordinary skill in the pertinent art that modifications and variations can be made to the step shown in FIG. 5C of the present invention. For example, UV beam illumination, ion diffusion, and other suitable techniques may be employed to form the waveguides.

The invention will be further clarified by the following examples that are intended to be exemplary of the invention. Various types of organic materials are used to implement waveguide structures 20 and 30. In one embodiment, at least one of the first and second waveguide structures 20 and 30 are implemented using various polymers and copolymers made from vinylic monomers, such as acrylates, methacrylates, acrylamides, styrene, acrylonitrile, or butadiene. Some examples of these polymers are PMMA, PS, SAN, TPA, or ABS. In another embodiment at least one of the first and second waveguide structures 20 and 30 are implemented using substituted derivatives of the vinylic monomers discussed above. In another embodiment, polymers prepared by polycondensation are used, such as: polyimines, polycarbonates, polyurethane, polyesters, or polyallyldiglycol-carbonate (CR-39). In another embodiment, at least one of the first and second waveguide structures 20 and 30 are implemented using polymers made from monomers, which polymerize and/or cross-link by ring opening, such as epoxies or lactones. In yet another embodiment, at least one of the first and second waveguide structures 20 and 30 are implemented using sol-gel hybrid materials. if the switch is used in the near IR region of the spectrum, it is advantageous to fabricate either or both of waveguide structures 20 and 30 from a polymer material having a low yield of hydrogen. Replacing hydrogen with deuterium, or halogens, such as fluorine or chlorine produces a polymer having a low yield of hydrogen. Again, one of ordinary skill in the art will recognize that any suitable waveguide material can be used to implement the first waveguide 20 and second waveguide 30, as long as the materials have different dn/dT coefficients. Note that the first and second waveguides 20 and 30 do not have to be made of the same material. For example, one could be made of a polymer and the other could be sol-gel.

As also depicted in FIG. 5C, a coupling region 40 or a splitting region 42, depending on the embodiment of device 10, is formed between the first waveguide structure 20 and the second waveguide structure 30. In the first embodiment, as depicted in FIG. 1, coupling region 40 is disposed where waveguides 20 and 30 are close enough to allow the evanescent field of the mode propagating in the second waveguide 30 to enter the first waveguide 20. In the second embodiment as shown in FIG. 2, the splitting region 42 is formed where the second waveguide 30 is connected to a middle region 24 of first waveguide 20.

Figure 5D:
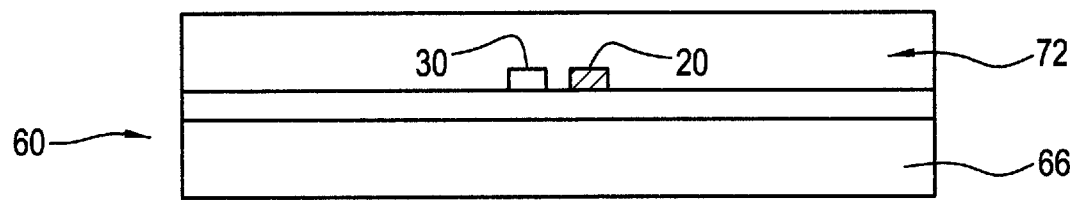

In FIG. 5D, overclad layer 72 is deposited over the waveguide structures 20 and 30. This can be implemented, for example, by spin coating a suitable overclad material over the substrate and the first waveguide 20 and the second waveguide 30 to form overclad layer 72. One of ordinary skill in the art will recognize that the overclad layer 72 must be thick enough to ensure a good optical isolation of the mode propagating in the waveguide. Note that the higher the refractive index difference between the core layer and the surrounding layers, the thinner the overclad layer 72 can be.

Figure 5E:
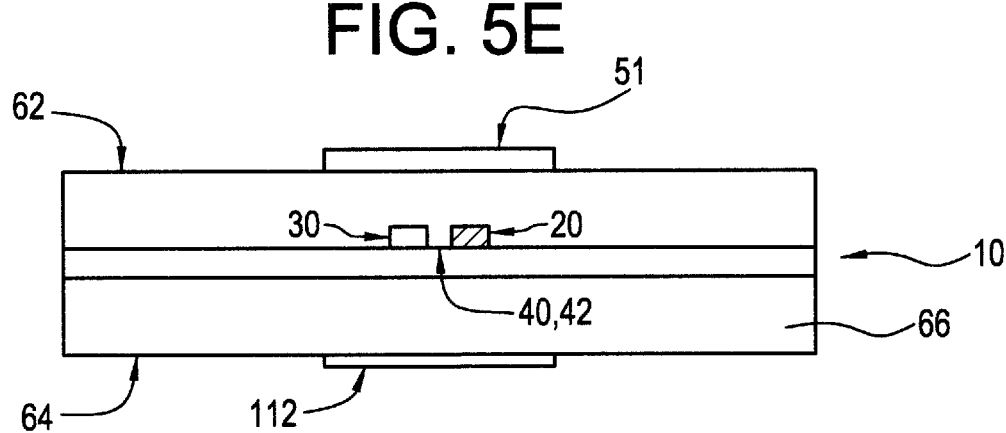

In FIG. 5E, the refractive index-adjusting switch element 50 is positioned over the coupling region 40 on either side of the wafer 60. The refractive index-adjusting switch element 50 is implemented by depositing a heating electrode over the coupling region 40 on first side 62. Refractive index-adjusting switch element 50 may be of any suitable well-known type, but there is shown by way of example, a NiCr metal film formed on the over cladding layer. In one embodiment discussed above, the cooling element 112 is deposited on second side 64 opposite the refractive index-adjusting switch element 50.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. An optical device for switching a light signal, said optical device including a substrate having a first side and a second side, said optical device comprising:

a first waveguide for propagating the light signal, said first waveguide disposed on the first side of the substrate and characterized by a first refractive index, a middle portion, and a first dn/dT coefficient;

a second waveguide for propagating the light signal, said second waveguide disposed on the first side of the substrate and characterized by a second refractive index and a second dn/dT coefficient different from said first dn/dT coefficient;

an index-adjusting switch element disposed on the first side of the substrate proximate to said first waveguide and said second waveguide, wherein said index-adjusting switch element controls a proportion of the light signal switched between said first waveguide and said second waveguide by adjusting said first and second refractive indexes.

2. The optical device according to claim 1, further comprising:

a coupling region disposed between the first waveguide and the second waveguide, wherein the proportion of the light signal switched between the first waveguide and the second waveguide is switched by coupling the light signal propagating in the first waveguide into the second waveguide.

3. The optical device according to claim 1, further comprising:

a splitting region formed by connecting the second waveguide to the middle portion to form a Y-splitter, wherein the proportion of the light signal switched between the first waveguide and the second waveguide is switched by directing the light signal propagating in the first waveguide into the second waveguide.

4. The optical device according to claim 1, wherein the proportion of the light signal switched between the first waveguide and the second waveguide is a maximum when a temperature of the optical device is in a predetermined ambient temperature range.

5. The optical device according to claim 4, wherein the index-adjusting switch element comprises a heater that increases the temperature of the optical device above the predetermined ambient temperature range when in an active state.

6. The optical device according to claim 5, wherein the proportion of the light signal coupled between the first waveguide and the second waveguide decreases when the heater is in the active state.

7. The optical device according to claim 5, wherein the first dn/dT coefficient has a positive value and the second dn/dT coefficient has a negative value.

8. The optical device according to claim 7, wherein the first refractive index increases and the second refractive index decreases when the heater is in the active state.

9. The optical device according to claim 5, the first dn/dT coefficient has a positive value and the second dn/dT coefficient has a positive value.

10. The optical device according to claim 9, wherein the first refractive index increases and the second refractive index increases when the heater is in the active state.

11. The optical device according to claim 5, the first dn/dT coefficient has a negative value and the second dn/dT coefficient has a negative value.

12. The optical device according to claim 11, wherein the first refractive index decreases and the second refractive index decreases when the heater is in the active state.

13. The method according to claim 5, wherein the first dn/dT coefficient has the same sign as the second dn/dT coefficient.

14. The optical device according to claim 1 further comprising:
a temperature controller disposed proximate the substrate for maintaining the optical device in a predetermined temperature range.

15. The optical device according to claim 14, wherein the temperature controller is a cooling device.

16. The optical device according to claim 15, wherein the cooling device is a Peltier effect element disposed on the second side of the substrate.

17. The optical device according to claim 1, wherein the first waveguide or second waveguide or both are fabricated from a silica glass material.

18. The optical device according to claim 1, wherein the first waveguide or second waveguide or both are fabricated from a polymer or copolymer material.

19. The optical device according to claim 1, wherein the first waveguide or second waveguide or both are fabricated from a polymer or copolymer material prepared with a substance or substances selected from the group consisting of vinylic monomers.

20. The optical device according to claim 1, wherein the first waveguide or second waveguide or both are fabricated from a polymer or copolymer material prepared with a substance or substances selected from the group consisting of:
acrylates, methacrylates, acrylamides, styrene, acrylonitrile, or butadiene.

21. The optical device according to claim 1, wherein the first waveguide or second waveguide or both are fabricated from a polymer or copolymer material selected from the group consisting of:
PMMA, PS, SAN, TPA, or ABS, and their derivatives.

22. The optical device according to claim 1, wherein the first waveguide or second waveguide or both are fabricated from a polymer prepared by polycondensation, said polymer selected from the group consisting of:
polyimines, polycarbonates, polyurethane, polyesters, or polyallyldiglycol-carbonate (CR-39).

23. The optical device according to claim 1, wherein the first waveguide or second waveguide or both are fabricated from a substance or substances that polymerize or cross-link by ring opening, or polymerize and cross-link by ring opening.

24. The optical device according to claim 23, wherein the substance or substances includes epoxy or lactose.

25. The optical device according to claim 1, wherein the first waveguide or second waveguide or both are fabricated from a sol-gel hybrid material.

26. The optical device according to claim 1, wherein the first waveguide or second waveguide or both are fabricated from an organic material.

27. The optical device according to claim 1, wherein the first waveguide or second waveguide or both are fabricated from a polymer having a low yield of hydrogen.

28. A method for switching a light signal through an optical device, said optical device including a substrate, a first waveguide disposed on said substrate, said first waveguide having a middle portion and characterized by a first refractive index and a first dn/dT coefficient, said method for directing a light signal comprising the steps of:
providing a second waveguide on the first side of the substrate, wherein said second waveguide characterized by a second refractive index and a second dn/dT coefficient, different from said first dn/dT coefficient; and,
adjusting the first refractive index and said second refractive index to switch a proportion of the light signal between the first waveguide and said second waveguide.

29. The method according to claim 28, wherein the step of providing the second waveguide further comprises:
forming a coupling region by disposing the second waveguide on the first side adjacent to the first waveguide.

30. The method according to claim 28, wherein the step of providing the second waveguide further comprises:
forming a splitting region by connecting the second waveguide to the middle portion.

31. The method according to claim 28, wherein the proportion of the light signal switched between the first waveguide and the second waveguide is a maximum when a temperature of the first and second waveguides is in a first predetermined temperature range.

32. The method according to claim 31, wherein the step of adjusting includes heating the first waveguide and the second waveguide.

33. The method according to claim 32, wherein the proportion of the light signal switched decreases when the temperature of the first waveguide and the second waveguide is increased.

34. A method of making an optical device for directing a light signal, said method comprising the steps of:

forming a substrate;

forming a first waveguide structure on said substrate, wherein said first waveguide structure has a middle portion and is characterized by a first refractive index and a first dn/dT coefficient;

forming a second waveguide structure on said substrate, wherein said second waveguide structure is characterized by a second refractive index and a second dn/dT coefficient, different from said first dn/dT coefficient; and, disposing an index-adjusting switch element on said middle portion.

35. The method according to claim 34, wherein the step of forming a second waveguide structure includes disposing the second waveguide on the substrate adjacent and proximate to first waveguide at the middle portion to form a coupling region.

36. The method according to claim 34, wherein the step of forming a second waveguide structure includes connecting the second waveguide to the middle region to form a splitting region.

37. The method according to claim 34, wherein the first waveguide or second waveguide or both are fabricated from a silica glass material.

38. The method according to claim 34, wherein the first waveguide or second waveguide or both are fabricated from a polymer or copolymer material.

39. The method according to claim 34, wherein the first waveguide or second waveguide or both are fabricated from a polymer or copolymer material prepared with a substance or substances selected from the group consisting of vinylic monomers.

40. The method according to claim 34, wherein the first waveguide or second waveguide or both are fabricated from a polymer or copolymer material prepared with a substance or substances selected from the group consisting of:

acrylates, methacrylates, acrylamides, styrene, acrylonitrile, or butadiene.

41. The method according to claim 34, wherein the first waveguide or second waveguide or both are fabricated from a polymer or copolymer derivative material, or a vinylic monomer, selected from the group consisting of:

PMMA, PS, SAN, TPA, or ABS.

42. The method according to claim 34, wherein the first waveguide or second waveguide or both are fabricated from a substance or substances that polymerize or cross-link by ring opening, or polymerize and cross-link by ring opening.

43. The method according to claim 42, wherein the substance or substances includes epoxy or lactone.

44. The method according to claim 34, wherein the first waveguide or second waveguide or both are fabricated from a polymer prepared by polycondensation, said polymer selected from the group consisting of:

polyimines, polycarbonates, polyurethane, polyesters, or polyallyldiglycol-carbonate (CR-39).

45. The method according to claim 34, wherein the first waveguide or second waveguide or both are fabricated from a sol-gel hybrid material.

46. The method according to claim 34, wherein the first waveguide or second waveguide or both are fabricated from an organic material.

47. The method according to claim 34, wherein the first waveguide or second waveguide or both are fabricated from a polymer with a low yield of hydrogen.

48. The method according to claim 34, wherein the steps of forming the first waveguide and forming the second waveguide are carried out using photolithographic techniques.

49. The method according to claim 34, wherein the steps of forming the first waveguide and forming the second waveguide are carried out using UV beam illumination techniques.

50. The method according to claim 34, wherein the steps of forming the first waveguide and forming the second waveguide are carried out using ion implantation techniques.

51. The method according to claim 34, wherein the steps of forming the first waveguide and forming the second waveguide are carried out using e-beam illumination techniques.

* * * * *